US009663639B2

(12) United States Patent
Kawashima

(10) Patent No.: US 9,663,639 B2
(45) Date of Patent: May 30, 2017

(54) RUBBER COMPOSITION FOR TIRE TREADS

(71) Applicant: BRIDGESTONE CORPORATION, Tokyo (JP)

(72) Inventor: Keisuke Kawashima, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/409,033

(22) PCT Filed: Jun. 4, 2013

(86) PCT No.: PCT/JP2013/065513
§ 371 (c)(1),
(2) Date: Dec. 18, 2014

(87) PCT Pub. No.: WO2014/002706
PCT Pub. Date: Jan. 3, 2014

(65) Prior Publication Data
US 2015/0183971 A1 Jul. 2, 2015

(30) Foreign Application Priority Data

Jun. 30, 2012 (JP) .................................. 2012-148064
Jun. 30, 2012 (JP) .................................. 2012-148065

(51) Int. Cl.
| C08L 9/06 | (2006.01) |
| C08K 3/36 | (2006.01) |
| C08C 19/25 | (2006.01) |
| C08L 15/00 | (2006.01) |
| C08K 3/04 | (2006.01) |

(52) U.S. Cl.
CPC ................ *C08L 9/06* (2013.01); *C08C 19/25* (2013.01); *C08K 3/04* (2013.01); *C08K 3/36* (2013.01); *C08L 15/00* (2013.01); *C08L 2205/025* (2013.01)

(58) Field of Classification Search
CPC .............................. C08L 9/06; C08L 2205/025
See application file for complete search history.

(56) References Cited

U.S. PATENT DOCUMENTS

| 4,963,615 A | 10/1990 | Yuto |
| 6,022,923 A * | 2/2000 | Araki .................... B60C 1/0016 152/209.1 |
| 6,077,899 A | 6/2000 | Yatsuyanagi et al. |
| 6,376,587 B1 * | 4/2002 | Ajiro .................... B60C 1/0016 524/252 |
| 6,433,065 B1 | 8/2002 | Lin et al. |
| 2007/0149688 A1 | 6/2007 | Hochi |
| 2011/0207847 A1 | 8/2011 | Sasaka et al. |
| 2011/0230593 A1 | 9/2011 | Kondo |
| 2012/0077902 A1 | 3/2012 | Steiner et al. |

FOREIGN PATENT DOCUMENTS

| EP | 0 659 821 A1 | 6/1995 |
| EP | 0 916 699 A2 | 5/1999 |
| EP | 1 308 317 A1 | 5/2003 |
| EP | 2 060 603 A1 | 5/2009 |
| JP | 9-59433 A | 3/1997 |
| JP | 9-67469 A | 3/1997 |
| JP | 2006077068 A | 3/2006 |
| JP | 2009179658 A | 8/2009 |
| JP | 2010132864 A | 6/2010 |
| JP | 2010-275386 A | 12/2010 |
| JP | 2013-001795 A | 1/2013 |
| WO | 2009/084667 A1 | 7/2009 |

OTHER PUBLICATIONS

Communication dated Nov. 10, 2015, issued by the Japan Patent Office in corresponding Japanese Application No. 2012-148064.
Office Action issued Nov. 18, 2014 in Japanese Patent Application No. 2012-148065.
Communication dated Aug. 31, 2015, issued by the State Intellectual Property Office of the P.R.C. in corresponding Chinese Application No. 201380032845.2.
International Search Report for PCT/JP2013/065513 dated Aug. 6, 2013.
Communication dated Apr. 1, 2016 from European Patent Office in counterpart Application No. 13810556.4.

* cited by examiner

*Primary Examiner* — Vickey Nerangis
(74) *Attorney, Agent, or Firm* — Sughrue Mion, PLLC

(57) ABSTRACT

The present invention is a rubber composition for tire treads, of which the temperature of the peak position of the temperature curve of tan δ is −16.0° C. or higher and −6.0° C. or lower, tan δ at the peak position is larger than 1.13, tan δ at 0° C. is 0.95 or more, and the value obtained by dividing the absolute value of the difference between tan δ at −5° C. and tan δ at 5° C. by the temperature difference between −5° C. and 5° C. {|(tan δ at −5° C.)−(tan δ at 5° C.)|/10} (/° C.) is smaller than 0.045/° C. The invention provides the rubber compositions for tire treads that more highly satisfy both low-heat-generation property and wet braking performance.

6 Claims, 1 Drawing Sheet

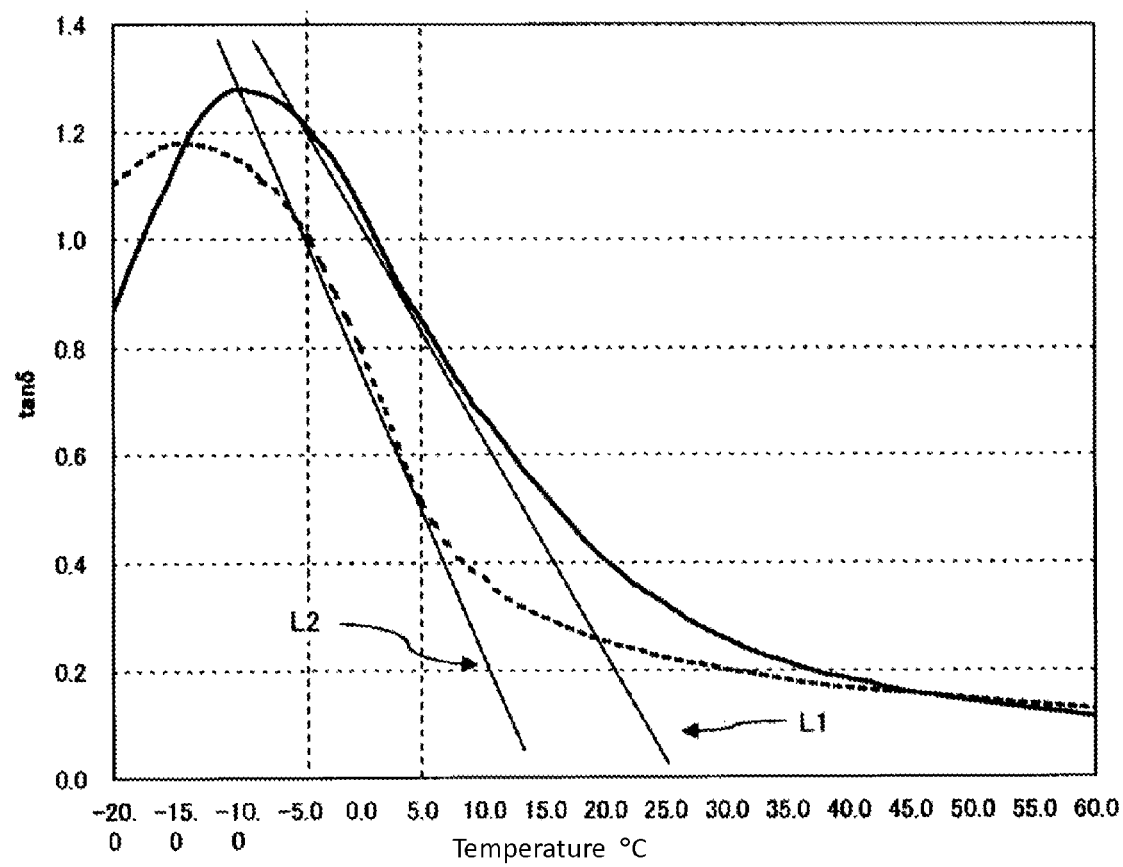

RUBBER COMPOSITION FOR TIRE TREADS

CROSS REFERENCE TO RELATED APPLICATIONS

This application is a National Stage of International Application No. PCT/JP2013/065513 filed Jun. 4, 2013, claiming priority based on Japanese Patent Application Nos. 2012-148064 filed Jun. 30, 2012 and 2012-148065 filed Jun. 30, 2012, the contents of all of which are incorporated herein by reference in their entirety.

TECHNICAL FIELD

The present invention relates to a rubber composition for tire treads excellent in braking performance on wet roads and having good fuel efficiency.

BACKGROUND ART

Recently, with social demand for energy saving, the requirement for vehicle fuel consumption reduction is being severer. To satisfy the requirement, it has become desired to reduce the rolling resistance for tire performance. As a method for reducing tire rolling resistance, there has been investigated a method of optimizing a tire structure; however, as the most general method, there is employed a method of improving the low-heat-generation property of tires by using a low-heat-generation material as a rubber composition.

Further, from the viewpoint of enhancing the safety in vehicle driving, it is important to secure braking performance on wet roads (hereinafter this may be abbreviated as "wet braking performance"), and it is also desired to secure wet braking performance along with improving the low-heat-generation property.

On the other hand, PTL 1 proposes a tire that uses, as the tread thereof, a rubber composition containing a rubber component containing an amine-based functional group-modified styrene-butadiene copolymer and a specific silica. Further, PTL 2 discloses a rubber composition for tire treads that contains a rubber component containing three types of rubbers of an emulsion-polymerized styrene-butadiene copolymer rubber, a terminal-modified solution-polymerized styrene-butadiene rubber and a butadiene rubber, and silica.

However, a rubber composition is desired capable of more highly satisfying both low-heat-generation property and wet braking performance.

PTL 1: WO2009/084667
PTL 2: JP-A-2010-275386

SUMMARY OF INVENTION

Technical Problem

Under such situation, an object of the present invention is to provide a rubber composition for tire treads capable of more highly satisfying both low-heat-generation property and wet breaking performance.

Solution to Problem

First, the present inventors have tried improving the dispersibility of filler, shifting the peak of tan δ in the temperature curve of tan δ of a rubber composition toward a higher temperature side and more increasing the peak value of tan δ. With that, in an effort to further improve the performance of a rubber composition, the present inventors have specifically noted the difference in wet braking performance by seasons, or that is, the fluctuation in wet braking performance caused by the difference in the road surface temperature between summer and winter. The present inventors have found that the difference in wet braking performance by seasons rather increases according to the above-mentioned method of shifting the peak of tan δ toward a higher temperature and more increasing the peak value of tan δ. Further, having pinned down the cause of the difference in wet braking performance by seasons, the present inventors have found that the temperature dependence at around 0° C. of the rubber composition is remarkable and that is the cause of producing the difference by seasons.

With that, the present inventors have found that, when the temperature range of the peak position of the temperature curve of tan δ is controlled adequately to thereby increase tan δ at around 0° C. and reduce the temperature dependence of tan δ at around 0° C., or that is, reduce the value obtained by dividing the absolute value of the difference between tan δ at −5° C. and tan δ at 5° C. by the temperature difference between −5° C. and 5° C., then high wet braking performance can be attained at any road surface temperature. The present invention has been completed on the basis of these findings.

Specifically, the present invention provides:

[1] A rubber composition for tire treads, of which the temperature of the peak position of the temperature curve of tan δ is −16.0° C. or higher and −6.0° C. or lower, tan δ at the peak position is larger than 1.13, tan δ at 0° C. is 0.95 or more, and the value obtained by dividing the absolute value of the difference between tan δ at −5° C. and tan δ at 5° C. by the temperature difference between −5° C. and 5° C. {|(tan δ at −5° C.)−(tan δ at 5° C.)|/10} (/° C.) is smaller than 0.045/° C.; and

[Method for measurement of tan δ: Using a dynamic tensile viscoelasticity measuring testing machine, the value of tan δ at a frequency of 52 Hz, at an initial strain of 2%, at a dynamic strain of 1% and at a heating rate of 3° C./min is measured in a range of from −25° C. to 80° C.]

[2] A rubber composition containing a rubber component that contains at least two types of styrene-butadiene copolymer rubbers differing in the bound styrene content therein, and a filler; the composition being a rubber composition for tire treads, in which the difference between the bound styrene content St(A) of the styrene-butadiene copolymer rubber (A) having a high bound styrene content and the bound styrene content St(B) of the styrene-butadiene copolymer rubber (B) having a low bound styrene content {St(A)−St(B)} is from 6 to 22% by mass, and of which tan δ at 0° C. is 0.95 or more, and the value obtained by dividing the absolute value of the difference between tan δ at −5° C. and tan δ at 5° C. by the temperature difference between −5° C. and 5° C. {|(tan δ at −5° C.)−(tan δ at 5° C.)|/10} (/° C.) is smaller than 0.045/° C.

[Method for measurement of bound styrene content (% by mass): The content is calculated from the integration ratio of the $^{1}$H-NMR spectrum.

Method for measurement of tan δ: Using a dynamic tensile viscoelasticity measuring testing machine, the value of tan δ at a frequency of 52 Hz, at an initial strain of 2%, at a dynamic strain of 1% and at a heating rate of 3° C./min is measured in a range of from −25° C. to 80° C.]

Advantageous Effects of Invention

According to the present invention, there is provided a rubber composition for tire treads capable of more highly satisfying both low-heat-generation property and wet braking performance and capable of reducing the difference in wet braking performance by seasons.

BRIEF DESCRIPTION OF DRAWING

FIG. 1 This is an explanatory view illustrating the temperature curve of tan δ of a rubber composition of the present invention and a rubber composition to be a comparative example, and {|(tan δ at −5° C.)−(tan δ at 5° C.)|/10} of those rubber compositions.

THE BEST MODE FOR CARRYING OUT THE INVENTION

Rubber Composition

The first aspect of the rubber composition for tire treads of the present invention is characterized in that the temperature of the peak position of the temperature curve of tan δ thereof is −16.0° C. or higher and −6.0° C. or lower, tan δ at the peak position thereof is larger than 1.13, tan δ at 0° C. thereof is 0.95 or more, and the value thereof obtained by dividing the absolute value of the difference between tan δ at −5° C. and tan δ at 5° C. by the temperature difference between −5° C. and 5° C. {|(tan δ at −5° C.)−(tan δ at 5° C.)|/10} (/° C.) is smaller than 0.045/° C.

Satisfying both the requirement that the value obtained by dividing the absolute value of the difference between tan δ at −5° C. and tan δ at 5° C. by the temperature difference between −5° C. and 5° C. {|(tan δ at −5° C.)−(tan δ at 5° C.)|/10} (/° C.) (hereinafter this may be abbreviated as α (/° C.)) is smaller than 0.045/° C. and the requirement that tan δ at 0° C. is 0.95 or more, the rubber composition more highly satisfies both low-heat-generation property and wet braking performance and, in addition, the difference in wet braking performance by seasons can be thereby reduced. When tan δ at 0° C. of the rubber composition is 0.95 or more, then the wet braking performance thereof can be thereby improved.

Here, tan δ is a value of tan δ at a frequency of 52 Hz, at an initial strain of 2%, at a dynamic strain of 1% and at a heating rate of 3° C./min in a range of from −25° C. to 80° C. that is measured from the ratio of the dynamic tensile loss elastic modulus E" to the dynamic tensile storage elastic modulus E' (E"/E') of the rubber composition, using a dynamic tensile viscoelasticity measuring testing machine.

When the temperature of the peak position of the temperature curve of tan δ of the rubber composition for tire treads of the present invention is −16.0° C. or higher, then the wet braking performance is improved; and when the temperature is −6.0° C. or lower, then the low-temperature brittleness resistance of the rubber composition can be bettered more. From the viewpoint of improving the wet braking performance, the temperature of the peak position of the temperature curve of tan δ of the rubber composition for tire treads of the present invention is preferably −12.0° C. or higher and −6.0° C. or lower. Tan δ at the peak position of the temperature curve of tan δ is preferably larger than 1.13 as the wet braking performance is improved, and more preferably, tan δ is larger than 1.20 as the wet braking performance is improved more.

The second aspect of the rubber composition for tire treads of the present invention is a rubber composition containing a rubber component that contains at least two types of styrene-butadiene copolymer rubbers differing in the bound styrene content therein, and a filler, and is characterized in that the difference between the bound styrene content St (A) of the styrene-butadiene copolymer rubber (A) having a high bound styrene content and the bound styrene content St(B) of the styrene-butadiene copolymer rubber (B) having a low bound styrene content {St (A)−St(B)} is from 6 to 22% by mass, that tan δ at 0° C. of the composition is 0.95 or more, and the value obtained by dividing the absolute value of the difference between tan δ at −5° C. and tan δ at 5° C. thereof by the temperature difference between −5° C. and 5° C. {|(tan δ at −5° C.)−(tan δ at 5° C.)|/10} (/° C.) is smaller than 0.045/° C.

Here, the bound styrene content (% by mass) is calculated from the integration ratio of the $^1$H-NMR spectrum; and tan δ is a value of tan δ at a frequency of 52 Hz, at an initial strain of 2%, at a dynamic strain of 1% and at a heating rate of 3° C./min in a range of from −25° C. to 80° C. that is measured from the ratio of the dynamic tensile loss elastic modulus E" to the dynamic tensile storage elastic modulus E' (E"/E'), using a dynamic tensile viscoelasticity measuring testing machine.

The above-mentioned α (/° C.) is described with reference to the drawing. FIG. 1 is an explanatory view illustrating the temperature curve of tan δ of a rubber composition of the present invention and a rubber composition to be a comparative example, and α (/° C.) of those rubber compositions. In FIG. 1, the temperature curve of tan δ of one example of the rubber composition of the present invention is shown by the solid line. L1 illustrates α (/° C.) of the rubber composition of the present invention. On the other hand, the temperature curve of tan δ of the rubber composition to be a comparative example is shown by the broken line. L2 illustrates α (/° C.) of the rubber composition to be a comparative example. As obvious from FIG. 1, the value tan δ at 0° C. of the rubber composition of the present invention is larger than value tan δ at 0° C. of the rubber composition to be a comparative example, and is 1.08. Further, α (/° C.) of the rubber composition of the present invention is smaller than α (/° C.) of the rubber composition to be a comparative example, and is 0.035.

Of the rubber composition of the present invention, {|(tan δ at −5° C.)−(tan δ at 5° C.)|/10} (/° C.), or that is, α is preferably larger than 0.025/° C., and tan δ at 60° C. is preferably 0.135 or less. This is because, when α is larger than 0.025/° C., then the wet braking performance is further improved, and when tan δ at 60° C. is 0.135 or less, then the low-heat-generation property is further improved.

From the viewpoint of more highly satisfying both low-heat-generation property and wet braking performance, the rubber composition for tire treads of the present invention preferably contains a rubber component containing a styrene-butadiene copolymer rubber (A) having a high bound styrene content and a styrene-butadiene copolymer rubber (B) having a low bound styrene content, and a filler. This is because, when the rubber component in the rubber composition for tire treads of the present invention contains at least two types of styrene-butadiene copolymer rubbers differing in the bound styrene content (% by mass) therein, then it becomes possible to impart different function assignations to the plural styrene-butadiene copolymer rubbers in the rubber component.

Here, the bound styrene content (% by mass) is calculated from the integration ratio of the $^1$H-NMR spectrum.

In the rubber composition for tire treads of the present invention, when the difference between the bound styrene content St(A) of the styrene-butadiene copolymer rubber (A) having a high bound styrene content and the bound styrene content St(B) of the styrene-butadiene copolymer rubber (B) having a low bound styrene content {St(A)−St(B)} is from 6 to 22% by mass, then different function assignations can be more favorably imparted to the plural styrene-butadiene copolymer rubbers in the rubber component therein.

Also preferably, from the viewpoint of improving the wet braking performance, the difference between the bound styrene content St(A) of the styrene-butadiene copolymer rubber (A) having a high bound styrene content and the bound styrene content St(B) of the styrene-butadiene copolymer rubber (B) having a low bound styrene content {St (A)−St (B)} is preferably from 12 to 22% by mass, more preferably from 15 to 22% by mass.

From the viewpoint of reducing α to lower than 0.045/° C., it is desirable that in the rubber composition for tire treads of the present invention, the filler is eccentrically located in the styrene-butadiene copolymer rubber (B) having a low bound styrene content. For eccentrically locating the filler in the styrene-butadiene copolymer rubber (B) having a low bound styrene content, for example, preferred are the following methods.

(1) In the first stage of kneading, a styrene-butadiene copolymer rubber (B) having a low bound styrene content and a filler are kneaded, and then in the second stage of kneading, a styrene-butadiene copolymer rubber (A) having a high bound styrene content is kneaded.
(2) As the styrene-butadiene copolymer rubber (B) having a low bound styrene content, used is a modified styrene-butadiene copolymer rubber having a high affinity for the filler.

In the present invention, styrene-butadiene copolymer rubber may be hereinafter abbreviated as "SBR".

In the above-mentioned method (1), it is desirable to add a dispersion improver along with the filler in the first stage of kneading for the purpose of further improving the dispersibility of the styrene-butadiene copolymer rubber (B) having a low bound styrene content and the filler. As the dispersion improver, preferred is at least one compound selected from guanidines, sulfenamides, thiazoles, thiurams, dithiocarbamates, thioureas and xanthates. As the guanidines, preferably exemplified is at least one compound selected from 1,3-diphenylguanidine, 1,3-di-o-tolylguanidine and 1-o-tolylbiguanide; as the sulfenamides, preferably exemplified are N-cyclohexyl-2-benzothiazolylsulfenamide and/or N-tert-butyl-2-benzothiazolylsulfenamide; as the thiazoles, preferably exemplified are 2-mercaptobenzothiazole and/or di-2-benzothiazolyl disulfide; as the thiurams, preferably exemplified are tetrakis(2-ethylhexyl)thiuram disulfide and/or tetrabenzylthiuram disulfide; as the thioureas, preferably exemplified is at least one compound selected from N,N'-diethylthiourea, trimethylthiourea, N,N'-diphenylthiourea and N,N'-dimethylthiourea; as the dithiocarbamates, preferably exemplified is at least one compound selected from zinc dibenzyldithiocarbamate, zinc N-ethyl-N-phenyldithiocarbamate, zinc dimethyldithiocarbamate and copper dimethyldithiocarbamate; and as the xanthates, preferably exemplified is zinc isopropylxanthate.

The styrene-butadiene copolymer rubbers (A) and (B) in the present invention may be emulsion-polymerized SBR or solution-polymerized SBR.

From the viewpoint of increasing tan δ at 0° C. of the rubber composition of the present invention, preferably, the bound styrene content St(A) of the styrene-butadiene copolymer rubber (A) having a high bound styrene content is 40% by mass or more, more preferably from 40 to 60% by mass, even more preferably from 40 to 55% by mass, especially preferably from 40 to 50% by mass.

In the above-mentioned method (2), it is desirable that the styrene-butadiene copolymer rubber (B) having a low bound styrene content is a modified SBR that is modified with a nitrogen-containing compound or a silicon-containing compound, from the viewpoint of increasing the affinity thereof for the filler.

The modified SBR that is modified with a nitrogen-containing compound or a silicon-containing compound is preferably a solution-polymerized SBR, and also preferably, the polymerization initiator is a lithium amide compound or the modifying agent used for the active terminal of SBR is a nitrogen-containing compound, a silicon-containing compound or a nitrogen and silicon-containing compound, more preferably a hydrocarbyloxysilane compound, especially preferably a nitrogen and silicon-containing hydrocarbyloxysilane compound. The modified SBR improves the dispersibility of the filler such as silica and/or carbon black or the like in the rubber component, and the low-heat-generation property of the rubber component can be thereby improved.

[Rubber Component]

The rubber component in the rubber composition of the present invention may be composed of two or more different types of SBR's alone that differ in point of the bound styrene content (% by mass) therein; however, within a range not contradictory to the technical solution of the present invention, the rubber component may contain any other dienic rubber than SBR. Preferably, the rubber component contains from 60 to 100% by mass of two or more different types of SBR's that differ in point of the bound styrene content (% by mass) therein, and from 40 to 0% by mass of any other dienic rubber than SBR, and more preferably the rubber component contains from 80 to 100% by mass of two or more different types of SBR's that differ in point of the bound styrene content (% by mass) therein, and from 20 to 0% by mass of any other dienic rubber than SBR.

Here, the other dienic rubber than SBR includes natural rubber, polybutadiene rubber, synthetic polyisoprene rubber, styrene-isoprene rubber, ethylene-butadiene copolymer rubber, propylene-butadiene copolymer rubber, ethylene-propylene-butadiene copolymer rubber, ethylene-α-olefin-diene copolymer rubber, butyl rubber, halogenobutyl rubber, halogenomethyl group-having styrene-isobutylene copolymer, chloroprene rubber, etc.

[Polymerization of Modified SBR]

In the present invention, for modifying the active terminal of the styrene-butadiene copolymer through reaction with a hydrocarbyloxysilane compound, especially with a nitrogen and silicon-containing hydrocarbyloxysilane compound, it is desirable that at least 10% of the polymer chain in the styrene-butadiene copolymer is a living one or a pseudo-living one. For such living polymerization, it is desirable that an organic alkali metal compound is used as an initiator and styrene and butadiene are reacted in a mode of anionic polymerization in an organic solvent. The anionic polymerization provides a polymer having a high vinyl bond content in the conjugated diene part therein and makes it possible to control the glass transition temperature Tg of the polymer to a desired temperature. Increasing the vinyl bond content can improve heat resistance, and increasing the cis-1,4-bond content can improve fuel efficiency and ice/snow performance.

As the organic alkali metal compound that is used as the initiator for anionic polymerization, preferred is an organic lithium compound. The organic lithium compound is not specifically defined, for which, however, preferably used here is a hydrocarbyl lithium or lithium amide compound. In case where the former hydrocarbyl lithium is used, there is obtained a styrene-butadiene copolymer which has a hydrocarbyl group at the polymerization starting terminal thereof and in which the other terminal is a polymerization active site; and the active terminal that is the polymerization active site is modified through reaction with the above-mentioned hydrocarbyloxysilane compound.

In case where the latter lithium amide compound is used, there is obtained a styrene-butadiene copolymer which has a nitrogen-containing group at the polymerization starting terminal thereof and in which the other terminal is a polymerization active site. In the case of a lithium amide compound, the modified SBR in the present invention may be obtained even though not modified with the above-mentioned hydrocarbyloxysilane compound; however, when the active terminal that is the polymerization active site of the copolymer is modified through a hydrocarbyloxysilane compound, especially through reaction with a nitrogen and silicon-containing hydrocarbyloxysilane compound, then there is obtained a so-called both terminals-modified styrene-butadiene copolymer, which is more desirable as capable of further increasing the dispersibility of and the reinforceability with the filler such as carbon black, silica or the like.

The polymerization initiator, hydrocarbyl lithium is preferably one having a hydrocarbyl group with from 2 to 20 carbon atoms, which includes, for example, ethyl lithium, n-propyl lithium, isopropyl lithium, n-butyl lithium, sec-butyl lithium, tert-octyl lithium, n-decyl lithium, phenyl lithium, 2-naphthyl lithium, 2-butylphenyl lithium, 4-phenylbutyl lithium, cyclohexyl lithium, cyclopentyl lithium, reaction product of diisopropenylbenzene and butyl lithium, etc. Of those, especially preferred is n-butyl lithium.

The polymerization initiator, lithium amide compound includes, for example, lithium hexamethyleneimide, lithium pyrrolidide, lithium piperidide, lithium heptamethyleneimide, lithium dodecamethyleneimide, lithium dimethylamide, lithium diethylamide, lithium dibutylamide, lithium dipropylamide, lithium diheptylamide, lithium dihexylamide, lithium dioctylamide, lithium di-2-ethylhexylamide, lithium didecylamide, lithium N-methylpiperazide, lithium ethylpropylamide, lithium ethylbutylamide, lithium ethylbenzylamide, lithium methylphenethylamide, etc. Of those, preferred are cyclic lithium amides such as lithium hexamethyleneimide, lithium pyrrolidide, lithium piperidide, lithium heptamethyleneimide, lithium dodecamethyleneimide, etc., from the viewpoint of interactivity with carbon black and polymerization initiability, and more preferred are lithium hexamethyleneimide and lithium pyrrolidide.

These lithium amide compounds for use for polymerization herein may be generally ones that have been previously prepared from a secondary amine and a lithium compound; however, the compounds may be prepared in a polymerization system (in-situ). The amount of the polymerization initiator to be used is preferably selected within a range of from 0.2 to 20 mmol per 100 g of the monomer.

The method of using the above-mentioned organic lithium compound as a polymerization initiator to produce the styrene-butadiene copolymer in a mode of anionic polymerization is not specifically defined, for which is employable any known conventional method.

Concretely, in an organic solvent inert to reaction, for example, in a hydrocarbon solvent such as an aliphatic, alicyclic or aromatic hydrocarbon compound or the like, a conjugated diene compound and an aromatic vinyl compound may be reacted in a mode of anionic polymerization using the above-mentioned lithium compound as a polymerization initiator optionally in the presence of a randomizer, thereby giving the intended, active terminal-having styrene-butadiene copolymer.

As the hydrocarbon solvent, preferred is one having from 3 to 8 carbon atoms. For example, there are mentioned propane, n-butane, isobutane, n-pentane, iso-pentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene, etc. One alone or two or more different types of these may be used here either singly or as combined.

The monomer concentration in the solvent is preferably from 5 to 50% by mass, more preferably from 10 to 30% by mass. In case of copolymerization of a conjugated diene compound and an aromatic vinyl compound, the content of the aromatic vinyl compound in the starting monomer mixture to be fed to the reactor is preferably from 5 to 55% by mass, more preferably from 6 to 45% by mass.

The randomizer that is optionally used here is a compound having the action of controlling the microstructure of the styrene-butadiene copolymer, for example, increasing the 1,2-bond in the butadiene moiety in a butadiene-styrene copolymer or increasing the 3,4-bond in an isoprene polymer, or for controlling the composition distribution of the monomer units in the conjugated diene-aromatic vinyl copolymer, for example, for randomizing the butadiene unit and the styrene unit in a butadiene-styrene copolymer. The randomizer is not specifically defined, and any one may be used here as suitably selected from known compounds that have heretofore been generally used as randomizers. Concretely, there are mentioned ethers, tertiary amines and others, such as dimethoxybenzene, tetrahydrofuran, dimethoxyethane, diethylene glycol dibutyl ether, diethylene glycol dimethyl ether, 2,2-bis(2-tetrahydrofuryl)-propane, triethylamine, pyridine, N-methylmorpholine, N,N,N',N'-tetramethylethylenediamine, 1,2-dipiperidinoethane, etc. In addition, potassium salts such as potassium t-amylate, potassium t-butoxide and the like, as well as sodium salts such as sodium t-amylate and the like are also usable here.

One alone or two or more different types of these randomizers may be used here either singly or as combined. The amount to be used is preferably selected within a range of from 0.01 to 1000 molar equivalents per one mol of the lithium compound.

The temperature of the polymerization reaction is preferably selected within a range of from 0 to 150° C., more preferably from 20 to 130° C. The polymerization may be carried out under a developed pressure, but in general, it is desirable to operate the reaction under a sufficient pressure under which the monomer can be kept substantially in a liquid phase. Specifically, the pressure may be, if desired, a higher pressure, though depending on the individual substances to be polymerized and the polymerization medium and the polymerization temperature to be employed, and such a pressure can be attained according to a suitable method of pressurizing the reactor with a gas inert to the polymerization reaction or the like.

The nitrogen and silicon-containing hydrocarbyloxysilane compound that is used as the modifier for obtaining the above-mentioned modified SBR is preferably N,N-bis(trimethylsilyl)aminopropylmethyldimethoxysilane, N,N-bis(trimethylsilyl)aminopropylmethyldiethoxysilane, N,N-bis(trimethylsilyl)aminoethylmethyldimethoxysilane, N,N-bis(trimethylsilyl)aminoethylmethyldiethoxysilane, 1-trimethylsilyl-2,2-diethoxymethyl-1-aza-2-silacyclopentane, N-(1,3-dimethylbutylidene)-3-(triethoxysilyl)-1-propanamine, N-{3-(triethoxysilyl)propyl}-4,5-dihydroimidazole, N,N-bis(trimethylsilyl)aminopropyltriethoxysilane, dimethylaminopropyltriethoxysilane or the like, and N,N-bis(trimethylsilyl)aminopropylmethyldimethoxysilane is especially preferred.

The silicon-containing compound, hydrocarbyloxysilane compound that is used as the modifier for obtaining the above-mentioned modified SBR includes, for example, tetramethoxysilane, tetraethoxysilane, tetra-n-propoxysilane, tetraisopropoxysilane, tetra-n-butoxysilane, tetraisobutoxysilane, tetra-sec-butoxysilane, tetra-tert-butoxysilane, methyltrimethoxysilane, methyltriethoxysilane, methyltripropoxysilane, methyltriisopropoxysilane, ethyltrimethoxysilane, ethyltriethoxysilane, propyltriethoxysilane, butyltrimethoxysilane, phenyltrimethoxysilane, phenyltriethoxysilane, dimethyldimethoxysilane, methylphenyldimethoxysilane, vinyltrimethoxysilane, vinyltriethoxysilane, divinyldimethoxysilane, divinyldiethoxysilane, etc. Of those, preferred is tetraethoxysilane.

One alone or two or more different types of those modifiers may be used here either singly or as combined. The modifier may be a partial condensate.

Here, the partial condensate means a derivative from a modifier in which a part (but not all) of SiOR therein forms an SiOSi bond through condensation.

In modification reaction with the above-mentioned modifier, the amount of the modifier to be used is preferably from 0.5 to 200 mmol/kg•styrene-butadiene copolymer. The content is more preferably from 1 to 100 mmol/kg•styrene-butadiene copolymer, especially preferably from 2 to mmol/kg•styrene-butadiene copolymer. Here, the styrene-butadiene copolymer means the mass of the polymer alone not containing any additive such as antioxidant and the like to be added during or after production. The modifier of which the amount to be used falls within the above range secures excellent filler dispersibility and improves the mechanical characteristics, abrasion resistance and fuel efficiency of vulcanized rubber.

The method of adding the above-mentioned modifier is not specifically defined. There are mentioned a method of adding it all at a time, a method of adding it after divided into portions, and a method of adding it sequentially. Preferred is a method of adding it all at a time.

The modifier may bond to any of the polymerization start terminal, the polymerization end terminal, and the polymer main chain or side chain, but from the viewpoint of preventing energy loss from the polymer terminal to thereby improve the fuel efficiency, the modifier is preferably introduced into the polymerization start terminal or the polymerization end terminal.

[Condensation Accelerator]

The modified SBR in the present invention preferably uses a condensation accelerator for promoting the condensation in which the modifier is involved.

As the condensation accelerator, usable here are compounds containing a tertiary amino group, or organic compounds containing one or more elements belonging to any of Group 3, Group 4, Group 5, Group 12, Group 13, Group 14 and Group 15 of the Periodic Table (long-period type). Further, as the condensation accelerator, also preferred are alkoxides, carboxylates or acetylacetonate complexes containing at least one or more metals selected from a group consisting of titanium (Ti), zirconium (Zr), bismuth (Bi), aluminum (Al) and tin (Sn). Of those condensation accelerators, especially preferred are titanium-based condensation accelerators such as tetrakis(2-ethyl-1,3-hexanediolato) titanium, tetrakis(2-ethylhexoxy) titanium, titanium di-n-butoxide (bis-2,4-pentanedionate), etc.

The condensation accelerator to be used here is preferably added to the modification reaction system during or after the modification reaction. When the condensation accelerator is added before the modification reaction, then there may occur direct reaction with the active terminal, and for example, there may be a case where a hydrocarbyloxy group having a protected primary amino group could not be introduced into the active terminal.

Regarding the time of addition, in general, the condensation accelerator is added in 5 minutes to 5 hours after the start of the modification reaction, preferably in 15 minutes to 1 hour after the start of the modification reaction.

Preferably, the weight-average molecular weight (Mw) before and after modification of SBR (A) and (B) for use in the rubber composition of the present invention is from 100,000 to 800,000, more preferably from 150,000 to 700,000. Having the weight-average molecular weight that falls within the above range, the rubber composition can have excellent fracture resistance while preventing the reduction in the modulus of elasticity of the vulcanized rubber and preventing the increase in the hysteresis loss thereof, and in addition, the rubber composition containing such SBR (A) and (B) provides excellent kneading workability. The weight-average molecular weight is determined through standard polystyrene conversion, based on a method of GPC.

[Filler]

Preferably, the rubber composition of the present invention contains the filler in an amount of from 30 to 150 parts by mass per 100 parts by mass of the rubber component therein, more preferably from 40 to 120 parts by mass. The filler content of 30 parts by mass or more may improve the abrasion resistance, and the filler content of 150 parts by mass or less may improve the fuel efficiency.

The filler is preferably silica and/or carbon black. In particular, the filler is preferably silica alone or silica and carbon black. Preferably, the content ratio of silica to carbon black (silica/carbon black) is from (100/0) to (30/70) by mass, more preferably from (100/0) to (50/50). The amount of silica to be incorporated is preferably from 10 to 100 parts by mass per 100 parts by mass of the rubber component, more preferably from 30 to 80 parts by mass. Within the range, the fuel efficiency, the ice/snow performance and the abrasion resistance can be bettered more and the wet braking performance can be improved more.

Silica includes, for example, wet method silica (silicic acid hydrate), dry method silica (silicic acid anhydride), calcium silicate, aluminum silicate, etc., and among these, wet method silica is desirable as effective for most remarkably satisfying both wet performance and abrasion resistance.

The BET specific surface area of silica (as measured according to ISO 5794/1) is preferably 80 $m^2/g$ or more, more preferably 120 $m^2/g$ or more, especially preferably 150 $m^2/g$ or more. The upper limit of the BET specific surface area is not specifically defined, but is generally 450 $m^2/g$ or so. As silica of the type, usable here are commercial products of Tosoh Silica's product names "Nipseal AQ" (BET specific surface area=205 m$^2$/g) and "Nipseal KQ", and Degussa's product name "Ultrasil VN3" (BET specific surface area=175 m$^2$/g), etc.

Carbon black is not specifically defined, and for example, usable here are HAF, N339, IISAF, ISAF, SAF, etc.

The specific surface area according to a nitrogen adsorption method of carbon black (N$_2$SA, as measured according to JIS K 6217-2:2001) is preferably from 70 to 180 m$^2$/g, more preferably from 80 to 180 m$^2$/g. The DBP oil absorption (as measured according to JIS K 6217-4:2008) is preferably from 70 to 160 cm$^3$/100 g, more preferably from 90 to 160 cm$^3$/100 g. Using carbon black enhances the improving effect for fracture resistance, abrasion resistance, etc. Especially preferred are N339, IISAF, ISAF and SAF excellent in abrasion resistance.

Each one alone or two or more different types of silica and/or carbon black may be used here either singly or as combined.

[Silane Coupling Agent]

In case where the rubber composition of the present invention uses, if desired, silica as one of reinforcing fillers therein, it is desirable that a silane coupling agent is incorporated in the composition for further improving the reinforceability thereof and the fuel efficiency.

The silane coupling agent includes, for example, bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazolyl tetrasulfide, 3-triethoxysilylpropylbenzolyl tetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyl tetrasulfide, dimethoxymethylsilylpropylbenzothiazolyl tetrasulfide, 3-octanoylthiopropyltriethoxysilane, etc. Of those, preferred are bis(3-triethoxysilylpropyl)polysulfide, 3-octanoylthiopropyltriethoxysilane and 3-trimethoxysilylpropylbenzothiazolyltetrasulfide, from the viewpoint of the reinforcing action improving effect.

One alone or two or more different types of these silane coupling agents may be used here either singly or as combined.

From the viewpoint of the effect of the coupling agent and of preventing gelation, the preferred amount to be incorporated of the silane coupling agent is, as ratio by mass, preferably (silane coupling agent/silica) of from (1/100) to (20/100). The amount of (1/100) or more may more favorably exhibit the effect of improving the low-heat-generation property of the rubber composition, and the amount of (20/100) or less may reduce the cost of the rubber composition and therefore enhances the economic potential thereof. Further, the amount is, as ratio by mass, more preferably from (3/100) to (20/100), especially preferably from (4/100) to (10/100).

Further, the rubber composition of the present invention may contain, if desired, various chemicals that are generally used in the rubber industry, for example, vulcanizing agent, vulcanization accelerator, process oil, antiaging agent, scorch inhibitor, zinc flower, stearic acid and others, within a range not detracting from the advantageous effects of the present invention.

The vulcanizing agent includes sulfur, etc., and the amount thereof to be used is preferably, as the sulfur fraction, from 0.1 to 10.0 parts by mass per 100 parts by mass of the rubber component, more preferably from 1.0 to 5.0 parts by mass. When the amount is less than 0.1 parts by mass, then the fracture strength, the abrasion resistance and the fuel efficiency of the vulcanized rubber may worsen; and when more than 10.0 parts by mass, the rubber elasticity may be lost.

Although not specifically defined, the vulcanization accelerator usable in the present invention includes, for example, thiazole-type vulcanization accelerators such as M (2-mercaptobenzothiazole), DM (dibenzothiazolyl disulfide), CZ (N-cyclohexyl-2-benzothiazolyl sulfenamide), etc.; guanidine-type vulcanization accelerators such as DPG (diphenylguanidine), etc.; thiuram-type vulcanization accelerators such as TOT (tetrakis(2-ethylhexyl)thiuram disulfide), etc. The amount of the vulcanization accelerator to be used is preferably from 0.1 to 5.0 parts by mass per 100 parts by mass of the rubber component, more preferably from 0.2 to 3.0 parts by mass.

The process oil for use as a softener in the rubber composition of the present invention, an aromatic oil may be used from the viewpoint of the miscibility with SBR. From the viewpoint of considering low-temperature characteristics as important, usable is naphthene oil or paraffin oil. The amount of the oil to be used is preferably from 0 to 100 parts by mass per 100 parts by mass of the rubber component. The amount of 100 parts by mass or less would not worsen the tensile strength and the fuel efficiency (low-heat-generation property) of the vulcanized rubber.

Further, the antiaging agent usable in the rubber composition of the present invention includes, for example, 3C (N-isopropyl-N'-phenyl-p-phenylenediamine), 6C [N-(1,3-dimethylbutyl)-N'-phenyl-p-phenylenediamine], AW (6-ethoxy-2,2,4-trimethyl-1,2-dihydroquinoline), high-temperature condensate of diphenylamine and acetone, etc. The amount of the agent to be used is preferably from 0.1 to 5.0 parts by mass per 100 parts by mass of the rubber component, more preferably from 0.3 to 3.0 parts by mass.

[Preparation of Rubber Composition, Production of Pneumatic Tire]

The rubber composition of the present invention may be obtained by kneading the components according to the above-mentioned formulation, using a kneading machine such as a Banbury mixer, a roll, an internal mixer or the like, and after molded, the composition is vulcanized and is favorably used as treads of pneumatic tires, especially as grounded parts of treads.

Using the rubber composition of the present invention as a tread and according to an ordinary tire production method, a tire can be produced. Briefly, the rubber composition of the present invention prepared to contain various chemicals as above is worked into various members in an unvulcanized state, and the member is stuck and molded on a tire molding machine according to an ordinary method to produce a green tire. The green tire is heated under pressure in a vulcanizer to give a tire.

In that manner, there can be obtained tires, especially pneumatic tires having good low heat-generation property and wet braking performance.

EXAMPLES

The present invention will be described more concretely with reference to the following Examples; however, the present invention is not restricted at all by these Examples. Various measurements in Examples were according to the following methods.

<Method for Measurement of Bound Styrene Content (% by mass)>

The content was calculated from the integration ratio of $^1$H-NMR spectrum.

<Method for Measurement of Tan δ>

Using Ueshima Seisakusho's Spectrometer (dynamic tensile viscoelasticity measuring testing machine), the value of tan δ of the rubber composition at a frequency of 52 Hz, at an initial strain of 2%, at a dynamic strain of 1% and at a heating rate of 3° C./min in a range of from −25° C. to 80° C. was measured from the ratio of the dynamic tensile loss elastic modulus E" to the dynamic tensile storage elastic modulus E' (E"/E') thereof.

[Evaluation of Tire Performance]

<Wet Braking Performance>

Four test tires having a tire size of 195/65R15 were put on a passenger car of 2000 cc displacement, and the car was driven on a wet test road of which the road surface temperature was set at 10° C. and 30° C. in a test course, and the tires were locked by pressing the brake pedal when the speed was 80 km/hr, whereupon the brake stopping distance was measured. The results are as follows. Taking the reciprocal of the brake stopping distance at a road surface temperature 10° C. of the tire in Comparative Example 1 as 100, the data were expressed as index indication, and taking the reciprocal of the brake stopping distance at a road temperature 30° C. of the tire in Example 4 as 100, the data were expressed as index indication. The samples having a larger index value have better wet braking performance.

Wet Braking Performance Index={(brake stopping distance of tire of Comparative Example 1 or Example 4)/(brake stopping distance of tire tested)}×100

<Low-Heat-Generation Property>

A tire having a tire size of 195/65R15 was rotated at a speed of 80 km/h using a rotary drum, and under a load of 4.41 kN applied thereto, the rolling resistance of the tire was measured. Taking the reciprocal of the rolling resistance of a control tire (Comparative Example 1) as 100, the data were expressed as index indication. The samples having a larger index value have a lower rolling resistance and have a better low-heat-generation property.

Low-Heat-Generation Index={(rolling resistance of tire of Comparative Example 1)/(rolling resistance of tire tested)}×100

Synthesis Example 1

Synthesis of N,N-bis(trimethylsilyl)aminopropylmethyldiethoxysilane

In a nitrogen atmosphere, 36 g of 3-aminopropylmethyldiethoxysilane (by Gelest) as an aminosilane site was added to 400 mL of dichloromethane solvent in a glass flask equipped with a stirrer, and then 48 mL of chlorotrimethylsilane (by Aldrich) as a protective site and 53 mL of triethylamine were added to the solution, and stirred at room temperature for 17 hours. Subsequently, the reaction solution was processed in an evaporator to remove the solvent to give a reaction mixture, and further the resulting reaction mixture was evaporated under a reduced pressure of 665 Pa to give 40 g of a 130 to 135° C. fraction, N,N-bis(trimethylsilyl)aminopropylmethyldiethoxysilane.

Production Example 1

Production of Unmodified SBR (B-1)

2,750 g of cyclohexane, 16.8 mmol of tetrahydrofuran, 125 g of styrene and 365 g of 1,3-butadiene were put into a nitrogen-purged autoclave reactor having an inner volume of 5 L (liters). The temperature of the reactor contents was controlled to be 10° C., and 1.2 mmol of n-butyl lithium was added thereto to start polymerization. The polymerization was carried out under an adiabatic condition, and the maximum temperature reached 85° C.

When the polymerization conversion reached 99%, 10 g of butadiene was added and further polymerized for 5 minutes. Next, an isopropanol solution of 2,6-di-tert-butyl-p-cresol (BHT) was added to the polymerization system to stop the polymerization. Subsequently, the system was dried in vacuum to give an unmodified SBR (B-1). The bound styrene content was 25% by mass, the weight-average molecular weight was 158,000, and the molecular weight distribution was 1.05.

Production Example 2

Production of Modified SBR (B-2)

Polymerization was carried out in the same manner as that for the unmodified SBR (B-1), and when the polymerization conversion reached 99%, 10 g of butadiene was added and further polymerized for 5 minutes. Next, a small amount of the polymer solution was sampled out from the reactor into 30 g of a cyclohexane solution with 1 g of methanol added thereto, thereafter 1.1 mmol of N,N-bis(trimethylsilyl) aminopropylmethyldiethoxysilane obtained in Synthesis Example 1 was added thereto, and the modification was carried out for 15 minutes. Subsequently, 0.6 mmol of tetrakis(2-ethyl-1,3-hexanediolato)titanium was added thereto, and further stirred for 15 minutes. Finally, 2,6-di-tert-butyl-p-cresol was added to the polymer solution after the reaction. Next, the solvent was removed and the protected primary amino group was deprotected through steam stripping, and the rubber was dried with a hot roll conditioned at 110° C. to give a modified SBR (B-2). The bound styrene amount in the modified SBR (B-2) thus obtained was 25% by mass, the vinyl content in the conjugated diene moiety was 56 mol %, the Mooney viscosity was 32, the weight-average molecular weight before modification was 158,000, and the molecular weight distribution before modification was 1.05.

Production Example 3

Production of Modified SBR (B-3)

A cyclohexane solution of butadiene (16 mol %) and a cyclohexane solution of styrene (21 mol %) were injected into a dried and nitrogen-purged 800-mL pressure-tight glass case in such a manner that butadiene could be 32.5 g and styrene could be 17.5 g, and 0.44 mmol of 2,2-ditetrahydrofurylpropane was injected thereinto, then 0.48 mmol of n-butyl lithium (BuLi) was added thereto, and polymerized in a water bath at 50° C. for 1.5 hours. The polymerization conversion was nearly 100%.

0.43 mmol of tetraethoxysilane was added to the polymerization system, which was then modified at 50° C. for 30 minutes. Subsequently, 1.26 mmol of tetrakis(2-ethylhexoxy)titanium and 1.26 mmol of water were added to the polymerization system, which was then condensed at 50° C. for 30 minutes. Next, 0.5 mL of an isopropanol 5 wt % solution of 2,6-di-t-butyl-p-cresol (BHT) was added to the polymerization system to stop the reaction. Subsequently, this was dried according to an ordinary method to give a tetraethoxysilane-modified SBR (B-3). The bound styrene amount in the modified SBR thus obtained was 35% by mass, the vinyl content in the conjugated diene moiety was 52 mol %, the Mooney viscosity was 64, the weight-average molecular weight before modification was 186,000, and the molecular weight distribution before modification was 1.07.

Examples 1 to 6, and Comparative Examples 1 and 2

Eight types of rubber compositions each comprising the compounded components shown in Table 1 were prepared. The rubber composition of Examples 1 to 6 and Comparative Examples 1 and 2 was arranged at the grounded part of the tread of a passenger car pneumatic radial tire having a tire size of 195/65R15, thereby producing 8 types of passenger car pneumatic radial tires. The tires were evaluated for the vulcanized rubber property tan δ, the wet braking performance and the low-heat-generation property thereof. The evaluation results are shown in Table 1. For tan δ, the vulcanized rubber piece was cut out of the tire and evaluated.

TABLE 1

| | | | Example | | | | | | Comparative Example | |
|---|---|---|---|---|---|---|---|---|---|---|
| | | | 1 | 2 | 3 | 4 | 5 | 6 | 1 | 2 |
| Compounded Component (part by mass) | First Stage of Kneading | SBR (A-1) *1 | — | 40 | 40 | — | — | 40 | — | — |
| | | SBR (A-2) *2 | — | — | — | 55 | — | — | 55 | — |
| | | SBR (A-3) *3 | — | — | — | — | 55 | — | — | 55 |
| | | SBR (B-1) *4 | 60 | — | — | — | — | — | — | — |
| | | SBR (B-2) *5 | — | 60 | 60 | 60 | 60 | — | — | — |
| | | SBR (B-3) *6 | — | — | — | — | — | 60 | 60 | 60 |
| | | Carbon black *7 | 5 | 5 | 5 | 5 | 5 | 5 | 5 | 5 |
| | | Silica *8 | 50 | 50 | 50 | 50 | 50 | 50 | 50 | 50 |
| | | Silane Coupling Agent 9* | 5 | 5 | 5 | 5 | 5 | 5 | 5 | 5 |
| | | Process Oil *10 | 15 | 15 | 15 | 0 | 0 | 15 | 0 | 0 |
| | | Vulcanization Accelerator DPG *11 | 1 | — | 1 | — | — | — | — | — |
| | Second Stage of Kneading | SBR (A-1) *1 | 40 | — | — | — | — | — | — | — |
| | Last Stage of Kneading | Stearic Acid | 2 | 2 | 2 | 2 | 2 | 2 | 2 | 2 |
| | | Zinc Flower | 3 | 3 | 3 | 3 | 3 | 3 | 3 | 3 |
| | | Antiaging Agent 6C *12 | 2 | 2 | 2 | 2 | 2 | 2 | 2 | 2 |
| | | Vulcanization Accelerator DPG *11 | 0 | 1 | 0 | 1 | 1 | 1 | 1 | 1 |
| | | Vulcanization Accelerator DM *13 | 1 | 1 | 1 | 1 | 1 | 1 | 1 | 1 |
| | | Vulcanization Accelerator NS *14 | 0.6 | 0.6 | 0.6 | 0.6 | 0.6 | 0.6 | 0.6 | 0.6 |
| | | Sulfur | 1.5 | 1.5 | 1.5 | 1.5 | 1.5 | 1.5 | 1.5 | 1.5 |
| Bound Styrene Content St(A) of SBR (A-1) to SBR (A-3) (mass %) | | | 46 | 46 | 46 | 40 | 37 | 46 | 40 | 37 |
| Bound Styrene Content St(B) of SBR (B-1) to SBR (B-3) (mass %) | | | 25 | 25 | 25 | 25 | 25 | 35 | 35 | 35 |
| St (A) − St (B) (mass %) | | | 21 | 21 | 21 | 15 | 12 | 11 | 5 | 2 |
| Properties of Rubber Composition | | | | | | | | | | |
| tan δ at 0° C. | | | 1.08 | 1.12 | 1.09 | 1.03 | 0.95 | 0.98 | 0.88 | 0.80 |
| α: {|(tan δ at −5° C.) − (tan δ at 5° C.)|/10} (/° C.) | | | 0.033 | 0.030 | 0.034 | 0.035 | 0.039 | 0.040 | 0.053 | 0.550 |
| tan δ at 60° C. | | | 0.128 | 0.129 | 0.125 | 0.130 | 0.131 | 0.129 | 0.130 | 0.128 |
| temperature (° C.) at peak position of tan δ of tan δ temperature curve | | | −10.5 | −10.8 | −10.8 | −12.9 | −15.4 | −10.7 | −13.1 | −14.5 |
| tan δ at peak position of tan δ temperature curve | | | 1.32 | 1.35 | 1.31 | 1.23 | 1.20 | 1.15 | 1.10 | 1.02 |
| Tire Performance | | | | | | | | | | |
| Wet Braking Performance Index at road surface temperature 10° C. | | | 115 | 120 | 115 | 109 | 103 | 105 | 100 | 95 |
| Wet Braking Performance Index at road surface temperature 30° C. | | | 105 | 113 | 106 | 100 | 95 | 95 | 90 | 83 |
| Low-Heat-Generation Property (rolling resistance index) | | | 101 | 101 | 103 | 100 | 100 | 100 | 100 | 100 |

[Notes]
*1: Emulsion-polymerized SBR: by JSR, product name "JSR 202", bound styrene content = 46% by mass, non-oil-extended
*2: Emulsion-polymerized SBR: by Nippon Zeon, product name "Nipol 1739", bound styrene content = 40% by mass, oil extended by 37.5 parts by mass per 100 parts by mass of rubber
*3: Emulsion-polymerized SBR: by JSR, product name "JSR 0122", bound styrene content = 37% by mass, oil extended by 37.5 parts by mass per 100 parts by mass of rubber
*4: Solution-polymerized SBR: unmodified SBR (B-1) obtained in Production Example 1, bound styrene content = 25% by mass
*5: Solution-polymerized SBR: N,N-bis(trimethylsilyl) aminopropylmethyldiethoxysilane-modified SBR (B-2) obtained in Production Example 2, bound styrene content = 25% by mass
*6: Solution-polymerized SBR: tetraethoxysilane-modified SBR (B-3) obtained in Production Example 3, bound styrene content = 35% by mass
*7: Carbon black: N234, by Tokai Carbon, product name "Seast 7HM"
*8: Silica: by Tosoh Silica, product name "Nipseal AQ"
*9: Silane coupling agent: bis(3-triethoxysilylpropyl) tetrasulfide, by Evonik, product name "Si69" (registered trademark)
*10: Process oil: processed distillate aromatic extract (TDAE), by JX Nippon Oil & Energy, product name "TDAE"
*11: Vulcanization accelerator DPG: by Ouchi Shinko Chemical Industry, product name "Nocceler D"
*12: Antiaging agent 6PPD: N-phenyl-N'-(1,3-dimethylbutyl)-p-phenylenediamine, by Ouchi Shinko Chemical Industry, product name "Noclac 6C"
*13: Vulcanization accelerator DM: di-2-benzothiazolyl disulfide, by Ouchi Shinko Chemical Industry, product name "Nocceler DM"
*14: Vulcanization accelerator NS: N-tert-butyl-2-benzothiazolylsulfenamide, by Ouchi Shinko Chemical Industry, product name "Nocceler NS"

As obvious from Table 1, the rubber compositions of Examples 1 to 6 were all good and were well-balanced in all the wet braking performance at a road surface temperature 10° C., the wet braking performance at a road surface temperature 30° C. and the low-heat-generation property, as compared with the rubber compositions of Comparative Examples 1 and 2.

INDUSTRIAL APPLICABILITY

The rubber composition for tire treads of the present invention more highly satisfies both low-heat-generation property and wet braking performance and can reduce the difference in wet braking performance by seasons, and are therefore favorably used for tread members, especially for grounded tread members for passenger car pneumatic tires such as all-season pneumatic tires, winterized pneumatic tires, summarized pneumatic tires, and also for mini-vehicle pneumatic tires, pickup truck pneumatic tires, truck/bus pneumatic tires, etc.

The invention claimed is:

1. A rubber composition containing a rubber component that contains styrene-butadiene copolymer rubber and a filler; the composition being a rubber composition for tire treads, of which the temperature of the peak position of the temperature curve of tan δ is −16.0° C. or higher and −6.0° C. or lower, tan δ at the peak position is larger than 1.13, tan δ at 0° C. is 0.95 or more, tan δ at 60° C. is 0.135 or less, the value obtained by dividing the absolute value of the difference between tan δ at −5° C. and tan δ at 5° C. by the temperature difference between −5° C. and 5° C. {|(tan δ at −5° C.)−(tan δ at 5° C.)|/10} (/° C.) is smaller than 0.045/° C., and a content ratio of silica/carbon black is from 100/0 to 30/70;

wherein method for measurement of bound styrene content in unit of % by mass: The content is calculated from the integration ratio of the $^1$H-NMR spectrum, and wherein method for measurement of tan δ: Using a dynamic tensile viscoelasticity measuring testing machine, the value of tan δ at a frequency of 52 Hz, at an initial strain of 2%, at a dynamic strain of 1% and at a heating rate of 3° C./min is measured in a range of from −25° C. to 80° C.

2. A rubber composition containing a rubber component that contains at least two types of styrene-butadiene copolymer rubbers differing in the bound styrene content therein, and a filler; the composition being a rubber composition for tire treads, in which the difference between the bound styrene content St(A) of the styrene-butadiene copolymer rubber (A) having a high bound styrene content and the bound styrene content St(B) of the styrene-butadiene copolymer rubber (B) having a low bound styrene content {St(A)−St(B)} is from 6 to 22% by mass, tan δ at 60° C. is 0.135 or less, and of which tan δ at 0° C. is 0.95 or more, and the value obtained by dividing the absolute value of the difference between tan δ at −5° C. and tan δ at 5° C. by the temperature difference between −5° C. and 5° C. {|(tan δ at −5° C.)−(tan δ at 5° C.)|/10} (/° C.) is smaller than 0.045/° C. and a content ratio of silica/carbon black is from 100/0 to 30/70;

wherein method for measurement of bound styrene content in unit of % by mass: The content is calculated from the integration ratio of the $^1$H-NMR spectrum, and wherein method for measurement of tan δ: Using a dynamic tensile viscoelasticity measuring testing machine, the value of tan δ at a frequency of 52 Hz, at an initial strain of 2%, at a dynamic strain of 1% and at a heating rate of 3° C./min is measured in a range of from −25° C. to 80° C.

3. The rubber composition for tire treads according to claim 2, wherein {|(tan δ at −5° C.)−(tan δ at 5° C.)|/10} (/° C.) is larger than 0.025/° C.

4. The rubber composition for tire treads according to claim 2, wherein the filler is eccentrically located in the styrene-butadiene copolymer rubber (B) having a low bound styrene content.

5. The rubber composition for tire treads according to claim 2, wherein the styrene-butadiene copolymer rubber (B) having a low bound styrene content is one modified with a nitrogen-containing compound or a silicon-containing compound.

6. The rubber composition for tire treads according to claim 2, wherein the bound styrene content St(A) of the styrene-butadiene copolymer rubber (A) having a high bound styrene content is 40% by mass or more.

* * * * *